XR 2,979,721

April 18, 1961

R. W. HELDA 2,979,721

TERMINAL INSERTER

Filed Sept. 2, 1958

3 Sheets-Sheet 1

INVENTOR
ROBERT W. HELDA
BY Robert E. Strauss
ATTORNEY

INVENTOR
ROBERT W. HELDA
BY Robert E. Strauss
ATTORNEY

April 18, 1961 R. W. HELDA 2,979,721

TERMINAL INSERTER

Filed Sept. 2, 1958 3 Sheets-Sheet 3

INVENTOR
ROBERT W. HELDA
BY Robert E. Strauss
ATTORNEY

United States Patent Office 2,979,721
Patented Apr. 18, 1961

2,979,721

TERMINAL INSERTER

Robert W. Helda, Williamsville, N.Y., assignor, by mesne assignments, to Sylvania Electric Products Inc., Wilmington, Del., a corporation of Delaware Filed Sept. 2, 1958, Ser. No. 758,452

4 Claims. (Cl. 1—1)

This invention generally relates to an apparatus for forming and inserting connectors. It is particularly adapted for the forming and inserting of wire wrap type terminals in the automated production of electrical chassis utilizing printed circuit boards. The chassis are produced on an automatic production line having an indexing conveyor and a plurality of component inserting stations. This mode of manufacture requires accurate registration coupled with high production rates.

Prior to this invention, the apparatus for inserting terminals into printed circuit boards was both complex and expensive due to the fact that the terminals were normally supplied prefabricated. The prefabricated terminals were fed into the inserting apparatus either in bulk form or in a chain-like arrangement where each terminal was attached to the preceding and following terminals by the stock material from which the terminal was formed. Both of these supply methods necessitated the use of complex orienting and feeding mechanisms so that the terminals would be properly fed and inserted. Further, the operation of the entire production line was dependent upon having a readily available supply of these prefabricated terminals. In addition, difficulties were encountered in changing the dimensions of prefabricated terminals in the circuit board. A change in the desired length of the terminal could not be made without scrapping the unused supply of prefabricated terminals.

The space on an automated production line between component inserting stations where the sockets, resistors and the like are installed is extremely limited. Accordingly, the previously used apparatus was undesirable since it required hoppers, vibratory feeders, indexing feeders or the like all of which were bulky and required a considerable amount of space.

Therefore, an object of this invention is to provide an improved apparatus for manufacturing and inserting terminal connectors.

Another object of this invention is to form and insert terminals which are fabricated continuously from a running length of stock material.

A further object of this invention is to form and insert terminals the length of which may be readily changed.

Still another object of this invention is to form and insert top, bottom, or through terminals in a printed circuit board utilizing the same stock material and apparatus.

Another object of this invention is the manufacture and insertion of terminal connectors in a printed circuit board by a compact, uncomplicated, easily adjusted apparatus.

Briefly, one aspect of the invention comprises a terminal forming and inserting machine having means for holding a supply of terminal stock material, means for forming terminals, means for feeding the terminal stock material from the supply means to the terminal forming means, means for receiving the formed terminals from the terminal forming means and inserting the terminal into a printed circuit board or workpiece, and means for supporting the workpiece during the terminal insertion.

The invention may be more readily understood when the following description is taken in conjunction with the accompanying drawings in which.

Figure 1:
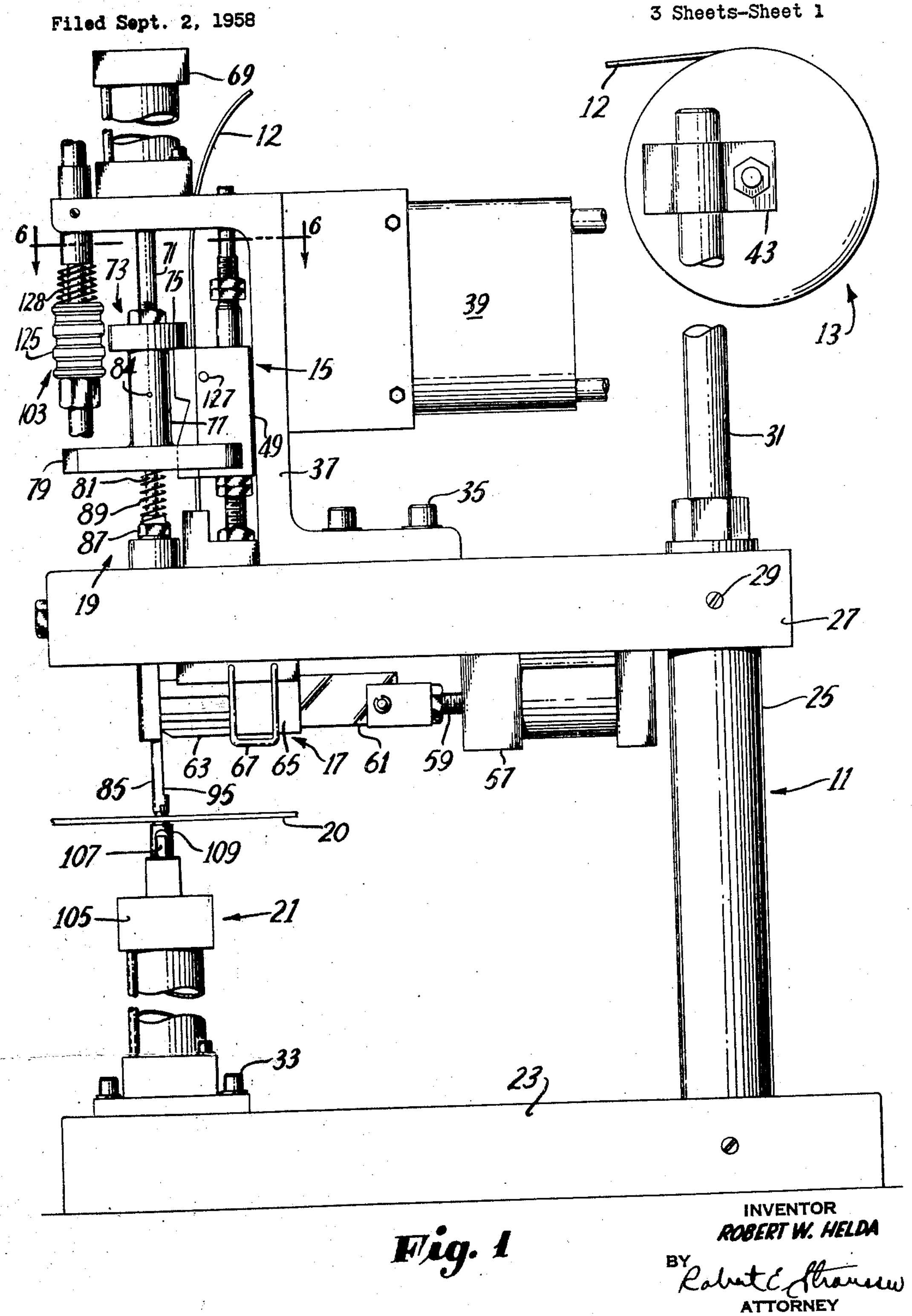
Fig. 1 is a side elevation view of a terminal forming and inserting device embodying features of the present invention, shown during the terminal insertion operation.

Referring to Fig. 1, one embodiment of the invention comprises a support 11, terminal stock supply 13, terminal stock feeding means 15, terminal forming means 17, inserting means 19 and workpiece support means 21.

Terminal stock 12 is drawn from the stock supply 13 and fed to the terminal forming means 17 by the reciprocation of the stock feeding means 15. The forming means 17 produces and transfers the terminal 18 to the inserting means 19 which subsequently inserts it into a printed circuit board 20 supported beneath the inserting means 19.

The support 11 consists of a base 23 and vertical post 25. A platform 27 is mounted on the post 25 by a set screw 29. This platform carries much of the operating mechanism of this embodiment such as the feeding means 15, inserting means 19 and forming means 17. At the upper end of the post 25 is a telescoping member 31 which may be used to adjust the height of the terminal stock supply 13 above the platform 27. The workpiece support means 21 is affixed to the base member 23 by bolts 33.

Adjustably mounted on the platform 27 by bolts 35 is a Z-shaped channel member 37 which acts as a support for the terminal feeding means 15 and terminal inserting means 19 as well as for the control valve 39.

The terminal stock supply 13 consists of a spool of terminal material 12 carried by bracket 43 which is affixed to member 31.

Figure 2:
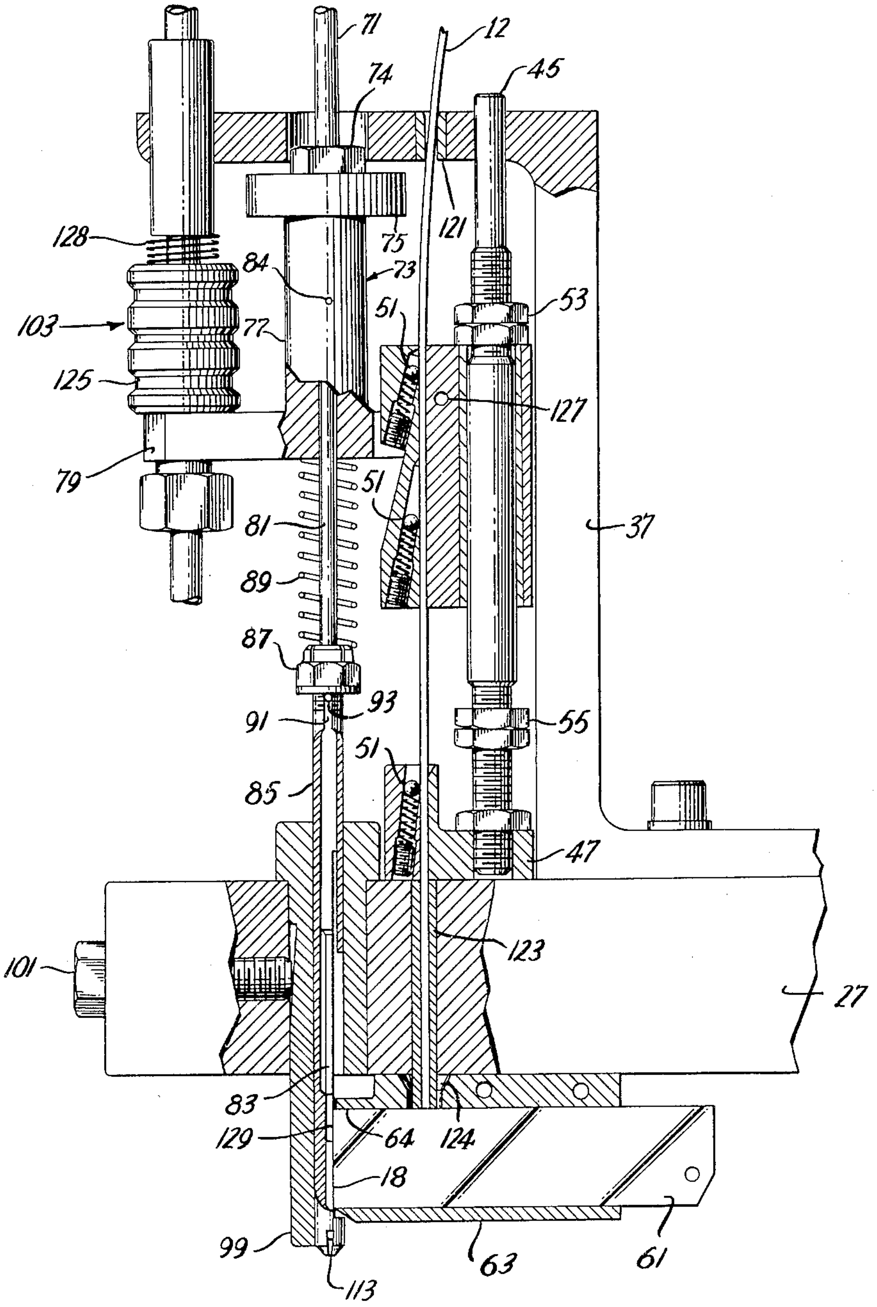
Fig. 2 is a side elevation view in partial section of a portion of the device of Fig. 1, shown prior to the terminal inserting and feeding operation.

Referring to Fig. 2, the stock feeding means 15, which is reciprocated as will be explained later, has a vertical shaft 45 which is supported at its upper end by the Z-shaped member 37 and has its lower end threadably fixed in the lower stock clutch 47. Slidably mounted on the shaft is the upper stock clutch 49 which contains two ball stops 51 which serve to wedge the terminal material during the feeding operation so that there is no relative movement on the descent of the upper stock clutch but free movement of the stock clutch 49 relative to the terminal material 12 of the ascent of the clutch. The lower stock clutch 47 also contains a ball element 51 which restrains by a wedging action the vertical movement of the terminal stock 12 on the withdrawal of the upper stock clutch 49. An adjustable upper stop 53 and lower stop 55 are provided on the vertical shaft 45 to control the limit of the stock clutch travel.

Figure 3:
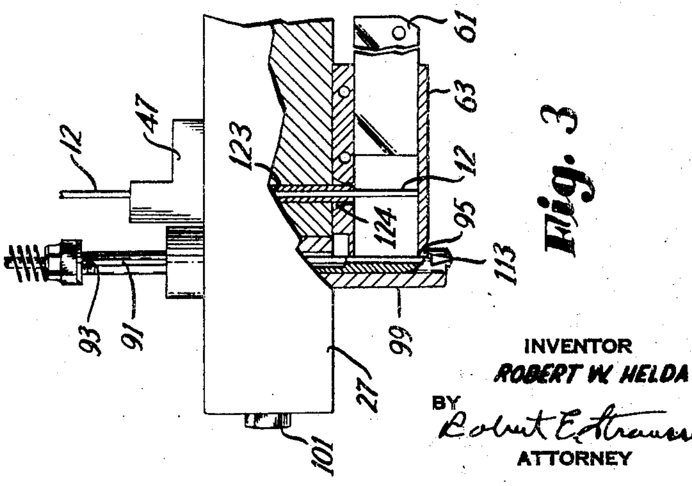
Fig. 3 is a side elevation view in partial section of a portion of the inserting and forming apparatus prior to the terminal formation.

The terminal forming means 17 is mounted beneath platform 27 and comprises a fluid motor 57, which may be either air or hydraulic, ram 59 and cutter bar 61, in combination with a slide box 63 having a removable side 65 held in place by a double pin 67. A predetermined length of terminal material 12 is fed into the side box 63 by the feeding means 15 through a bushing 123 in the platform 27 and an opening 124 in the slide box 63 (see Figs. 3 and 5). When the pressure is applied to the fluid motor 57 causing the ram 59 to advance the cutter bar 61 into the slide box 63 (see Fig. 4), the length of terminal material 12 which protrudes into the slide box is severed and transferred by the continued movement of the slide to the terminal inserting means 19. The removable side 65 of the slide box 63 is provided so that in the event that a jam or misalignment of the severed terminal occurs the difficulty may easily be cleared.

Referring to Figs. 1 and 2, the terminal inserting means is operated by a fluid motor 69. The ram 71 of the fluid motor is connected at 74 to an adjustable coordinating operator 73 which is composed of an upper collar 75, a body portion 77, and a lower collar 79 (see Fig. 6). A push rod 81, which terminates in an elongated finger or insertion member 83, is adjustably attached to the operator 73 by a set screw 84. Concentrically mounted on the push rod 81 is a collet member 85 supported at its upper end by an adjustable stop 87. A spring 89 is provided between the stop 87 and the under surface of the lower collar 79 which serves to advance the collet member 85 in an extended position relative to the inserter 83 until resistance is encountered. The collet 85 which is concentric with the push rod 81 is restrained from rotational movement by a slot 91 in the collet side wall and a pin 93 which passes through the push rod and is affixed therein. An additional slot 95, Fig. 5, in the side of the collet is provided for feeding the terminal to the elongated finger 83 within the collet 85. The end 64 of the slide box 63 protrudes partially into the slot so provided. The terminal 18 is fed to the collet by the forming mechanism 17, as will be later described, by passing through the slot in the collet.

The collet 85 and push rod 81 assembly pass through the platform 27 in a bushing 99. The bushing is retained in the platform by a bolt 101 and serves to support the collet during the insertion operation as well as guiding it through the platform. It also serves as a stop to limit the descent of the collet member 85.

Also mounted on the Z-shaped member 37 which supports the stock feeding means 15 and terminal forming means 17 is a mechanical air valve 103 which cooperates with the lower collet collar 79 to synchronize the operation of the terminal forming means 17 with the stock feeding means 15 and terminal inserting means 17.

The workpiece support 21 comprises a fluid motor 105 which has a ram member 107. Fixed to the upper or free end of the ram member is the workpiece support 109 which has a die-like opening 111 in its upper surface. The workpiece support means 21 is affixed to the base 23 by the bolts 33, so that the die-like opening 111 is in alignment with the opening 113 in the lower end of the collet member 85.

Figure 5:
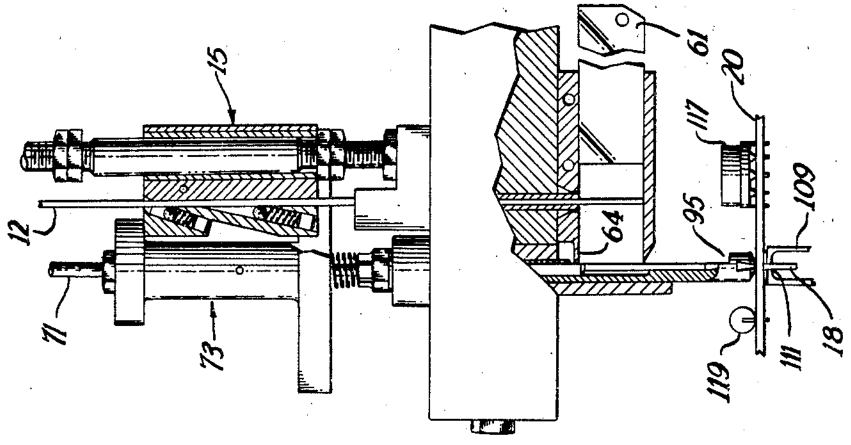
Fig. 5 is another view similar to Fig. 3 showing the end of the terminal inserting and feeding operation.
Figure 6:
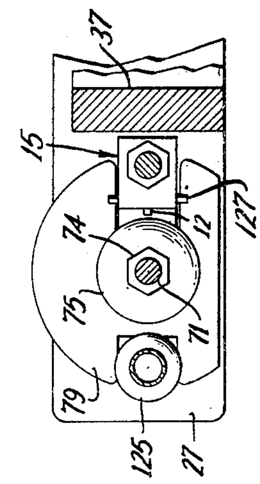
Fig. 6 is a plan view taken along the line 6—6 of Fig. 1 showing the coordinating mechanism.
Figure 4:
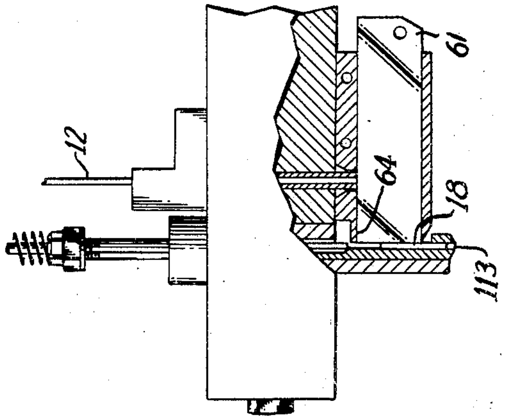
Fig. 4 is a view similar to Fig. 3 but shown after the terminal formation.

The description of the operation of the terminal forming 17 and inserting means 19 will commence with the terminal inserting means 19 and the stock feeding means 15 in the upper or retracted position (Figs. 2 and 4). The cycle is initiated by a control means (not shown) which may be a switch on a conveyor (not shown) which feeds the printed circuit boards or workpieces 20 to a position beneath the inserting mechanism. Since both the terminal inserting means and the work supporting means are in a retracted position at the initiation of the cycle, the printed circuit board 20 may be passed through the separation between the two units with complete safety for other components such as the sockets 117 or resistor 119 previously inserted (Fig. 5). Initiation of the cycle energizes the solenoid valve 39 which allows fluid pressure to be applied to the fluid motor 69. This causes the ram 71 and the operator 73 to descend vertically. The operator 73 acts as a co-ordinating means for the feeding, inserting and forming means. Since the push rod 81 is affixed to the operator 73, it and the collet 85 also descend. The descent of the operator 73 allows the body 125 of the mechanical valve 103 to be shifted by the spring 128 releasing the fluid pressure from fluid motor 57 and withdrawing the cutter slide 61 from its previous advanced position. The continued descent of the operator 73 causes the under surface of the collar 75 to contact the upper surface of the stock clutch 49 and slide it along the shaft 45. The spring urged ball checks 51 are so inclined that the descent of the stock clutch 29 wedges the terminal material 12 against relative movement. This causes the material 12 to move with the stock clutch, drawing the terminal stock through the bushing 121 in the upper arm of the Z-shaped member 37 and feeding it through the lower stock clutch 47 and the bushing 123 into the slide box 63 of the terminal forming means. The descent of the stock clutch continues until contacting the stop 55, which has been so adjusted that the terminal material 41 bottoms lightly in the slide box 63.

The insertion of the terminal 18 into the workpiece 20 takes place simultaneously with the feeding operation (Fig. 5). The collet 85 descends with the push rod 81 under the influence of the spring 89 until the adjustable stop 87 abuts the upper surface of bushing 99 at which time it is arrested while the pushrod continues to descend. The stop 87 permits adjustment of the collet position relative to the workpiece 20. The inserter member 83 of the pushrod contacts a terminal 18, which was deposited vertically into the collet 85 by a previous operation of the forming mechanism 17, and pushes it through the opening 113 of the collet into the workpiece 20. The depth of penetration of terminal into and through the work piece is determined by the pushrod. This penetration may be adjusted by varying the extension of the pushrod beyond the operator 73 by the set screw 84.

Simultaneous with the application of pressure to fluid motor 69, pressure is applied to the fluid motor 105 of the workpiece support means 21. This causes ram 107 carrying the workpiece support 109 to advance to a position beneath and in contact with the undersurface of the workpiece 20. Due to the shorter distance traversed, it is in a supporting position prior to the terminal insertion. The die-like opening 111 in the support is aligned with the opening 113 in the collet 85 through which the terminal 18 passes (see Fig. 5). This arrangement can be used with perforated or unperforated workpieces. When used with unperforated workpieces of the type normally used in manufacturing printed circuit electrical chassis such as one having a conductive foil applied to a paper filled phenolic, sufficient force can be generated through the push rod 83 and terminal 18 in cooperation with die-like opening 111 in the support, to cause the terminal to make its own hole in which it will be retained. When a pre-perforated board is used various provisions can be made to anchor the terminal such as by using rectangular or square cross-section terminal material and a round aperture in the printed circuit board where the diagonal or diagonals of the terminal cross section exceeds the diameter of the hole in the board thus forming an interference fit between the terminal and the board.

Afer the terminal has been inserted, the external control (not shown), is operated by means (not shown) causing a reversal of the solenoid valve 39. This causes the fluid motors 69, 105 of the inserting means 19 and workpiece support means 21 to retract. Upward movement of the operator 73 causes the collar 79 to contact the pin 127 thus sliding the stock clutch 49 along the vertical shaft 45. The terminal material 12 in the slide box 63 is restrained against withdrawal by the action of the spring urged ball check 51 in the lower stock clutch 47. The ball checks 51 in the upper stock clutch 49 allow the clutch to move freely upwardly relative to the immobilized terminal materal.

Continued upward movement of the operator 73 causes the collar 79 to shift the body 125 of the mechanical valve 103 allowing pressure to be applied to the fluid motor 57 of the terminal forming means 17. This causes the cutter slide 61 to rapidly advance horizontally serving the length of terminal stock 12 protruding into the slide box 63 beyond the end of the bushing 123 (Figs. 2 and 4). The rapid forward motion of the slide 61 and the severed terminal 18 travelling with it continues until the forward end 129 of the slide abuts the end 64 of the slide box. The terminal 18 then drops into the collet end where it is held vertical by the configuration of the interior of the collet member until insertion on a subsequent cycle. When the operator 73 has reached its uppermost position, the apparatus is ready for another cycle.

The vertical insertion and feeding means combined with the horizontal forming means result in a compact easily maintained and adjusted apparatus which is readily fitted into a crowded automated production line.

Although one embodiment has been shown and described it is to be realized that variations and modifications may be made therein without limiting the generally of the foregoing, for example the substitution of a system of cams and levers for the fluid pressure motors or the substitution of electrical controls for those which are mechanically operated. These and other variations and modifications may be made without departing from the scope of the invention as defined by the appended claims.

What is claimed is:

1. In a machine for forming and inserting terminals in a workpiece comprising the combination of means for holding a supply of terminal stock material means for forming terminals; means for feeding the terminal stock material from the supply means to the terminal forming means; means for receiving the formed terminals from said terminal forming means and inserting said terminal in a workpiece comprising a reciprocable operator, means for reciprocating said operator, a push rod adjustably fixed at one end to said operator and terminating in an insertion member at the free end, a pin passing transversely through said shaft and extending there beyond, a collet member slidably mounted on said push rod about said free end and concentric therewith, a slot in the side of said collet member for cooperation with said pin through the push rod for preventing relative rotation therebetween, a spring compressibly mounted about said push rod between the operator and said collet member, a further slot in said collet member to facilitate loading of a terminal in the collet; and means for supporting the workpiece during the terminal insertion.

2. In a machine for forming and inserting terminals in a workpiece comprising the combination of means for holding a supply of terminal stock material, means for forming terminals, means for feeding the terminal stock material from the supply means to the terminal forming means, means for receiving the formed terminals from said terminal forming means and inserting said terminal into the workpiece, said inserting means including a push-rod having an end formed as an inserter and a collet member concentric therewith for holding the terminal to be inserted, and means for supporting the workpiece during the terminal insertion.

3. In a machine for forming and inserting terminals in a workpiece comprising the combination of means for holding a supply of terminal stock material; means for forming terminals; means for feeding the terminal stock material from the supply means to the terminal forming means; means for receiving the formed terminals from said terminal forming means and inserting said terminal into the workpiece, said inserting means including a push-rod having an end formed as an inserter, a collet member concentric therewith for holding the terminal to be inserted, and a stop to limit the descent of the collet member while allowing the push rod to continue pushing the terminal through the collet member; and means for supporting the workpiece during the terminal insertion.

4. A machine for forming and inserting terminals in a workpiece comprising the combination of a frame; terminal stock supply means mounted on said frame; coordinating means comprising a first fluid motor mounted on said frame; control means for said fluid motor; a ram reciprocable by said fluid motor and an operator mounted at its upper end to said ram; means for feeding the terminal stock material to terminal forming means coordinated therewith said feeding means comprising a fixed shaft, a first stock clutch movable by said operator from a first position to a second position for advancing the terminal stock, a second stock clutch mounted on said frame and adapted to receive said terminal stock material said first stock clutch being reciprocably mounted relative to said second stock clutch on said shaft, a pin through said first stock clutch for engagement with said operator to return said first stock clutch to said first position from said second position; means for forming a terminal and transferring said terminal to terminal inserting means; means in cooperative relation with said terminal forming means for inserting said terminal in a workpiece, comprising a push rod adjustably affixed to the lower end of said operator, the free end of said push rod terminating in an inserter, a pin transversely through said push rod and extending there beyond, a collet member slidably mounted on said push rod about said free end and concentric therewith, a slot in the side of said collet member for cooperation with said last memtioned pin through the push rod for preventing relative rotation therebetween, a spring compressibly mounted about said push rod between the operator and said collet member, a further slot in said collet member to facilitate loading of a terminal in the collet; and means for supporting the workpiece during the terminal insertion.

References Cited in the file of this patent

UNITED STATES PATENTS

| | | |
|---|---|---|
| 944,275 | Phelan | Dec. 28, 1909 |
| 949,373 | Inwood | Feb. 15, 1910 |
| 960,278 | Cutter | June 7, 1910 |